J. T. Martin,
Lancet,
Nº 17,994.    Patented Aug. 11, 1857.
Fig: 1.
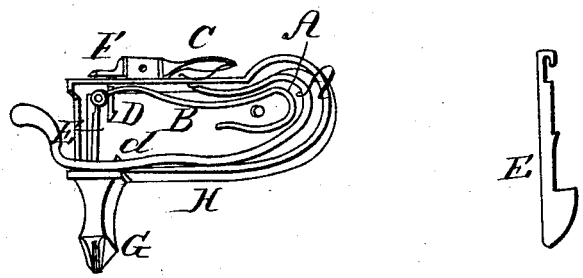

UNITED STATES PATENT OFFICE.

JEFFERSON T. MARTIN, OF MOUNDSVILLE, VIRGINIA, ADMINISTRATOR OF WILLIAM PARKINSON, DECEASED.

SPRING-LANCET.

Specification of Letters Patent No. 17,994, dated August 11, 1857.

*To all whom it may concern:*

Be it known that I, JEFFERSON T. MARTIN, administrator of WILLIAM PARKINSON, deceased, late of Marshall county, Virginia, claim that said PARKINSON did invent a new Spring-Lancet, called the "Snake-Tongue Lancet," of which the following is an exact description, reference being had to the annexed drawing, marked No. 1.

The nature of the invention is, by an accurate adjustment of two springs, to throw out the blade of the lancet and immediately draw it back into its sheath, the form of the instrument permitting it to be held in any position, to give the incision length or depth.

No. 1 is a side view.

A, main spring, by which the blade is thrown out, B, reaction spring, by which the blade is drawn back and to which it is attached; C, thumb-spring; D, the hold upon which the main spring catches, when the lancet is set and ready for use; E, side view of blade; F, part of thumb spring; G, sheath, in which the blade works; H, side view of the case.

What is claimed as the invention of said PARKINSON is—

The application and adjustment of the spring B, being the reaction spring by which the blade is instantly drawn back, by which safety and accuracy are attained in bleeding.

J. T. MARTIN.

Witnesses:
WILLIAM MARTIN,
C. J. CARNEY.